(12) United States Patent
Huang et al.

(10) Patent No.: US 11,425,388 B2
(45) Date of Patent: Aug. 23, 2022

(54) METHODS AND APPARATUSES OF CODING PICTURES WITH CTU BASED SLICE PARTITIONS IN VIDEO CODING SYSTEM

(71) Applicant: MEDIATEK INC., Hsinchu (TW)

(72) Inventors: Yu-Wen Huang, Hsinchu (TW); Lulin Chen, San Jose, CA (US); Chih-Wei Hsu, Hsinchu (TW)

(73) Assignee: MEDIATEK INC., Hsinchu (TW)

( * ) Notice: Subject to any disclaimer, the term of this patent is extended or adjusted under 35 U.S.C. 154(b) by 0 days.

(21) Appl. No.: 17/218,320

(22) Filed: Mar. 31, 2021

(65) Prior Publication Data

US 2021/0314571 A1 Oct. 7, 2021

Related U.S. Application Data

(60) Provisional application No. 63/073,990, filed on Sep. 3, 2020, provisional application No. 63/005,397, filed on Apr. 5, 2020.

(51) Int. Cl.
*H04N 19/132* (2014.01)
*H04N 19/119* (2014.01)
*H04N 19/192* (2014.01)
*H04N 19/176* (2014.01)
*H04N 19/70* (2014.01)
*H04N 19/186* (2014.01)
*H04N 19/46* (2014.01)

(52) U.S. Cl.
CPC ......... *H04N 19/132* (2014.11); *H04N 19/119* (2014.11); *H04N 19/176* (2014.11); *H04N 19/186* (2014.11); *H04N 19/192* (2014.11); *H04N 19/46* (2014.11); *H04N 19/70* (2014.11)

(58) Field of Classification Search
CPC .......................... H04N 19/132; H04N 19/176
See application file for complete search history.

(56) References Cited

U.S. PATENT DOCUMENTS

| | | | | |
|---|---|---|---|---|
| 2013/0107973 A1* | 5/2013 | Wang | ...................... | H04N 19/82 375/240.29 |
| 2015/0016540 A1* | 1/2015 | Rapaka | ................ | H04N 19/105 375/240.24 |
| 2015/0264351 A1* | 9/2015 | Miyoshi | ............... | H04N 19/139 375/240.13 |
| 2017/0347109 A1 | 11/2017 | Hendry et al. | | |

OTHER PUBLICATIONS

Chinese language office action dated Feb. 9, 2021, issued in application No. TW 110112106.

* cited by examiner

*Primary Examiner* — Jerry T Jean Baptiste
(74) *Attorney, Agent, or Firm* — McClure, Qualey & Rodack, LLP

(57) ABSTRACT

Video processing methods and apparatuses include receiving input data associated with a current picture composed of multiple Coding Tree Units (CTUs) for encoding or decoding, partitioning the current picture into one or more slices including raster scan slices or rectangular slices, and for each slice in the current picture, encoding or decoding each slice by always processing CTUs within each slice in a raster scan order. Each slice includes an integer number of complete CTUs in the current picture that are exclusively contained in a single Network Access Layer (NAL) unit. Tile partition and tile concept may be removed to reduce the coding complexity of video processing.

17 Claims, 9 Drawing Sheets

METHODS AND APPARATUSES OF CODING PICTURES WITH CTU BASED SLICE PARTITIONS IN VIDEO CODING SYSTEM

CROSS REFERENCE TO RELATED APPLICATIONS

The present invention claims priority to U.S. Provisional Patent Application Ser. No. 63/005,397, filed on Apr. 5, 2020, entitled "Method of specifying a generic CTU based slice structure in video coding", and U.S. Provisional Patent Application Ser. No. 63/073,990, filed on Sep. 3, 2020, entitled "Generic CTU based slice partitions in video coding". The U.S. Provisional Patent Applications are hereby incorporated by reference in their entireties.

FIELD OF THE INVENTION

The present invention relates to video coding methods and apparatuses for encoding or decoding video data. In particular, the present invention relates to CTU based slice partitioning for video coding systems.

BACKGROUND AND RELATED ART

The Versatile Video Coding (VVC) standard is the latest video coding standard developed by the Joint Collaborative Team on Video Coding (JCT-VC) group of video coding experts from ITU-T Study Group. The VVC standard relies on a block-based coding structure which divides each picture into multiple Coding Tree Units (CTUs). A CTU consists of an N×N block of luminance (luma) samples together with one or more corresponding blocks of chrominance (chroma) samples. For example, each CTU consists of one 32×32 luma Coding Tree Block (CTB) and two 16×16 chroma CTBs for 4:2:0 chroma subsampling. FIG. 1 shows an example of a picture divided into multiple CTUs. Each CTU is further recursively divided into one or more Coding Units (CUs) for encoding or decoding to adapt to various local characteristics.

The prediction decision in video encoding or decoding is made at the CU level, where each CU is either coded by inter picture (temporal) prediction or intra picture (spatial) prediction. After obtaining a residual signal generated by the prediction process, the residual signal belong to a CU is further transformed into transform coefficients for compact data representation, and these transform coefficients are quantized and conveyed to the decoder.

Various Picture Partitioning Methods in VVC A picture can be divided into one or more tile rows and one or more tile columns, and a tile is a sequence of CTUs that covers a rectangular region within a particular tile column and a particular tile row in the picture. The feature of tiles was mainly for parallel processing purposes, and tile partitioned rectangular slices forming subpictures may also be used in viewport based 360 degrees video applications. The processing order for tile partition of a picture is tile raster scan within the picture and CTU raster scan within a tile. Tiles break in-picture prediction dependencies as well as entropy decoding dependencies. The feature of slices is mainly used for subpicture level access and ultralow delay. Raster scan slice mode and rectangular slice mode are two slice structure modes supported in the VVC standard. Rectangular slices are always in a rectangular shape while raster scan slices may or may not be in a rectangular shape. A raster scan slice consists of an integer number of complete tiles of a picture that are exclusively contained in a single Network Abstraction Layer (NAL) unit, and a rectangular slice consists of an integer number of complete tiles of a picture or an integer number of consecutive complete CTU rows within a tile of a picture that are exclusively contained in a single NAL unit. In the raster-scan slice mode, a slice contains a sequence of complete tiles in a raster scan order of tiles in a picture. In the rectangular slice mode, a slice contains either a number of complete tiles that collectively form a rectangular region of the picture or a number of consecutive complete CTU rows of one tile that collectively form a rectangular region of the picture. Tiles within a raster scan slice are processed in a tile raster scan order within the slice. Tiles within a rectangular slice are processed in a tile raster scan order within the rectangular region corresponding to that slice. A subpicture contains one or more slices that collectively cover a rectangular region of a picture. Subpictures in a picture allow independent coding and extraction of a rectangular subset of a sequence of coded pictures for use cases like viewport-dependent 360 degrees video streaming optimization and region of interest applications. Subpictures allow motion vectors of a coding block pointing outside of the subpicture even when the subpicture is extractable, thus allowing padding at subpicture boundaries as picture boundaries.

There are generally three cases for the relationship between tiles and slices in the VVC standard: tiles in raster scan slices, tiles in rectangular slices, and rectangular slices in tiles. FIG. 2 illustrates an example of tiles in raster scan slices, where a picture is divided into 12 tiles and contained 3 raster scan slices. There are 3 tile columns and 4 tile rows in the picture as shown in FIG. 2, and each tile consists of 18 CTUs. A first slice of the picture consists of the first 2 tiles, a second slice consists of five consecutive tiles in the tile raster scan order, and a third slice consists of the remaining 5 tiles. FIG. 3 illustrates an example of tiles in rectangular slices, where the picture is divided into 24 tiles and contained 9 rectangular slices. There are 6 tile columns and 4 tile rows in this example. Except for the fourth, fifth, and sixth rectangular slices each having 4 tiles, all other rectangular slices are consisting of 2 tiles. FIG. 4 shows an example of rectangular slices in tiles, where a picture is partitioned into tiles and rectangular slices, and one tile may contain multiple rectangular slices and one rectangular slice may contain multiple tiles. The picture in FIG. 4 is divided into 4 tiles and 4 rectangular slices. In this example, there are 2 tile columns and 2 tile rows, and each tile contains 54 CTUs. A rectangular slice in this example may contain 2 tiles, or alternatively, a tile may contain 2 rectangular slices. FIG. 5 shows an example of subpicture partitioning of a picture, where the picture is partitioned into 28 subpictures of varying dimensions.

After a picture is partitioned according to one of the three cases, the tile and slice boundaries impose constraints on coding tools in the decoding processing. In the decoding processing, the two types of boundaries, the tile boundary and slice boundary, are treated equally in the processing of edge checking and neighboring block availability checking, Quantization Parameter (QP) setting, Context-Adaptive Binary Arithmetic Coding (CABAC) initialization, and loop filtering. In other words, both the tile and slice boundaries impose constraints on various coding tools. There are two control flags loop_filter_across_slices_enabled_flag and loof_filter_across_tile_enabled_flag specified in the PPS as shown in Table. 1, and these two control flags indicate whether the loop filter operation is applied across the slice boundaries and tile boundaries respectively.

TABLE 1

| | |
|---|---|
| no_pic_partition_flag | u(1) |
| if( !no_pic_partition_flag ) { | |
|   pps_log2_ctu_size_minus5 | u(2) |
|   ... | |
|   loop_filter_across_tiles_enabled_flag | u(1) |
|   loop_filter_across_slices_enabled_flag | u(1) |
| } | |

In the VVC standards, there are some differences between the usage of tiles and slices, for example, subpicture layout is directly based on slices instead of tiles, subpicture boundaries coincide with slice boundaries, and the slice size defines the data size in a single NAL unit. The subpicture boundaries related processing overrides the processing of slice boundaries. Parallel processing may be based on tile partitions.

High Level Syntax for Tile, Slice, and Subpicture Layouts Based on Versatile Video Coding (VVC) Draft 8, tile partition and rectangular slice structures are specified in the Picture Parameter Set (PPS) as shown in Table 2, which covers both cases of uniform and non-uniform tile columns and rows for a slice layout. The layout of rectangular slices is signaled in the PPS based on the layout of tiles, and information of the tiles included in a raster scan slice is signaled in the slice header. Table 3 demonstrates the syntax elements associated with the raster scan slice case according to VVC Draft 8. For the raster scan slice case, the slice structure is specified in the slice header in terms of the number of tiles in each slice. The subpicture layout is specified in the Sequence Parameter Set (SPS).

TABLE 2

| | Descriptor |
|---|---|
| pic_parameter_set_rbsp( ) { | |
|   pps_pic_parameter_set_id | ue(v) |
|   pps_seq_parameter_set_id | u(4) |
|   mixed_nalu_types_in_pic_flag | u(1) |
|   pic_width_in_luma_samples | ue(v) |
|   pic_height_in_luma_samples | ue(v) |
|   pps_conformance_window_flag | u(1) |
|   ... | |
|   no_pic_partition_flag | u(1) |
|   if( !no_pic_partition_flag ) { | |
|     pps_log2_ctu_size_minus5 | u(2) |
|     num_exp_tile_columns_minus1 | ue(v) |
|     num_exp_tile_rows_minus1 | ue(v) |
|     for( i = 0; i <= num_exp_tile_columns_minus1; i++ ) | |
|       tile_column_width_minus1[ i ] | ue(v) |
|     for( i = 0; i <= num_exp_tile_rows_minus1; i++ ) | |
|       tile_row_height_minus1[ i ] | ue(v) |
|     if( NumTilesInPic > 1 ) | |
|       rect_slice_flag | u(1) |
|     if( rect_slice_flag ) | |
|       single_slice_per_subpic_flag | u(1) |
|     if( rect_slice_flag && !single_slice_per_subpic_flag ) { | |
|       num_slices_in_pic_minus1 | ue(v) |
|       if( num_slices_in_pic_minus1 > 0 ) | |
|         tile_idx_delta_present_flag | u(1) |
|       for( i = 0; i < num_slices_in_pic_minus1; i++ ) { | |
|         if( NumTileColumns > 1 ) | |
|           slice_width_in_tiles_minus1[ i ] | ue(v) |
|         if( NumTileRows > 1 && ( tile_idx_delta_present_flag \|\| | |
|           SliceTopLeftTileIdx[ i ] % NumTileColumns = = 0 ) ) | |
|           slice_height_in_tiles_minus1[ i ] | ue(v) |
|         if( slice_width_in_tiles_minus1[ i ] = = 0 && | |
|           slice_height_in_tiles_minus1[ i ] = = 0 && | |
|           RowHeight[ SliceTopLeftTileIdx[ i ] / NumTileColumns ] 1 > 1) { | |
|           num_exp_slices_in_tile[ i ] | ue(v) |
|           for( j = 0; j < num_exp_slices_in_tile[ i ]; j++ ) | |
|             exp_slice_height_in_ctus_minus1[ i ][ j ] | ue(v) |
|           i += NumSlicesInTile[ i ] − 1 | |
|         } | |
|         if( tile_idx_delta_present_flag && i < num_slices_in_pic_minus1 ) | |
|           tile_idx_delta[ i ] | se(v) |
|       } | |
|     } | |
|     loop_filter_across_tiles_enabled_flag | u(1) |
|     loop_filter_across_slices_enabled_flag | u(1) |
|   } | |
|   cabac_init_present_flag | u(1) |
|   ... | u(1) |
|   pps_extension_flag | u(1) |
|   if( pps_extension_flag ) | |
|     while( more_rbsp_data( ) ) | |
|       pps_extension_data_flag | u(1) |
|   rbsp_trailing_bits( ) | |
| } | |

TABLE 3

| | Descriptor |
|---|---|
| slice_header( ) { | |
|   picture_header_in_slice_header_flag | u(1) |
|   if( picture_header_in_slice_header_flag ) | |
|     picture_header_structure( ) | |
|   if( subpic_info_present_flag ) | |
|     slice_subpic_id | u(v) |
|   if( ( rect_slice_flag && NumSlicesInSubpic | |
|   [ CurrSubpicIdx ] > 1 ) \|\| | |
|     ( !rect_slice_flag && NumTilesInPic > 1 ) ) | |
|     slice_address | u(v) |
|   for( i = 0; i < NumExtraShBits; i++ ) | |
|     sh_extra_bit[ i ] | u(1) |
|   if( !rect_slice_flag && NumTilesInPic > 1 ) | |
|     num_tiles_in_slice_minus1 | ue(v) |
|   if( ph_inter_slice_allowed_flag ) | |
|     slice_type | ue(v) |
|   ... | |
|   if( slice_header_extension_present_flag ) { | |
|     slice_header_extension_length | ue(v) |
|     for( i = 0; i < slice_header_extension_length; i++) | |
|       slice_header_extension_data_byte[ i ] | u(8) |
|   } | |
|   byte_alignment( ) | |
| } | |

BRIEF SUMMARY OF THE INVENTION

Embodiments of video processing methods for a video encoding or decoding system receive input data associated with a current picture composed of multiple Coding Tree Units (CTUs) for encoding or decoding, partition the current picture into one or more slices including raster scan slices or rectangular slices, and for each slice in the current picture, encode or decode each slice by always processing CTUs within each slice in a raster scan order. Each CTU consists of a block of luma samples and one or more corresponding blocks of chroma samples. Each slice includes an integer number of complete CTUs in the current picture that are exclusively contained in a single Network Access Layer (NAL) unit. In some embodiments of partitioning the current picture into tiles, where each tile is a rectangular region of CTUs within a particular tile column and a particular tile row, the slices are raster scan slices formed by multiple consecutive tiles in a raster scan order or the slices are rectangular slices formed by dividing the current picture into rectangular regions each containing multiple complete tiles. In some embodiments of removing tile partition constraints and concept, the slices are raster scan slices formed by multiple consecutive CTUs in a raster scan order, or the slices are rectangular slice formed by dividing the current picture into rectangular regions each containing multiple complete CTUs. Each of the raster scan slices is specified based on a number of consecutive CTUs, and each of the rectangular slices is specified based on multiple grids with a grid column width and a grid row height in the unit of CTUs.

In some embodiments of partitioning the current picture into multiple tiles, where each tile consists of a rectangular region of CTUs within a particular tile column and a particular tile row, encoding or decoding each slice further includes disabling tile boundary related processing. For example, tile boundary related processing includes one or a combination of edge checking and neighboring block availability checking for tile boundaries for Quantization Parameter (QP) derivation and Context based Adaptive Binary Arithmetic Coding (CABAC) initialization, and loop filtering processing across tile boundaries. In some embodiments, a first flag is signaled in a video bitstream by the video encoding system or the first flag is parsed from the video bitstream by the video decoding system. Tile boundary related processing is adaptively enabled or disabled according to a value of the first flag, for example, tile boundary related processing can be enabled when the first flag is equal to 1 and tile boundary related processing is disabled when the first flag is equal to 0. In one embodiment, the first flag is signaled in a Sequence Parameter Set (SPS) associated with the current picture or parsed from a SPS associated with the current picture.

In some embodiments of partitioning the current picture into multiple tiles, tile partitioning is only used as a partition grid for slice layout, and tile boundary related processing is always disabled, i.e. tile boundaries after the partition do not impose any constraints in encoding or decoding process.

The current picture is composed of multiple subpictures according to an embodiment, where each subpicture is a rectangular region of one or more slices within the current picture. The subpicture boundary related processing overrides coinciding slice boundary related processing. In cases when parallel processing is used to encode or decode each slice in the current picture, parallel processing is based on subpicture or rectangular slice partitions.

Slice boundary related processing is enabled during video encoding or video decoding according to some embodiments of the present invention. For example, slice boundary related processing includes one or a combination of edge checking and neighboring block availability checking for slice boundaries for QP derivation, and CABAC initialization, and loop filtering processing across slice boundaries.

The step of partitioning the current picture into one or more rectangular slices includes signaling or parsing syntax elements related to a position of a top-left CTU for each rectangular slice in the unit of CTUs, a slice width and slice height for each rectangular slice in the unit of CTUs. The step of partitioning the current picture into one or more raster scan slices includes signaling or parsing syntax elements related to a raster scan CTU index of a first CTU in each raster scan slice and a number of CTUs in each raster scan slice.

In some embodiments, shapes of the slices in the current picture are constrained during decoding to have an entire left boundary and entire top boundary consisting of picture boundaries or consisting of boundaries of previously decoded slices.

Aspects of the disclosure further provide an apparatus for a video encoding or decoding system. Some embodiments of the apparatus receive input data associated with a current picture, wherein the current picture is composed of multiple CTUs for encoding or decoding, and each CTU consists of a block of luma samples and one or more corresponding blocks of chroma samples, partition the current picture into one or more slices including raster scan slices or rectangular slices, and for each slice, encode or decode each slice by always processing CTUs within each slice in a raster scan order. Each slice includes an integer number of complete CTUs in the current picture that are exclusively contained in a single NAL unit.

BRIEF DESCRIPTION OF THE DRAWINGS

Various embodiments of this disclosure that are proposed as examples will be described in detail with reference to the following figures, wherein like numerals reference like elements, and wherein.

DETAILED DESCRIPTION OF THE INVENTION

Figure 1:
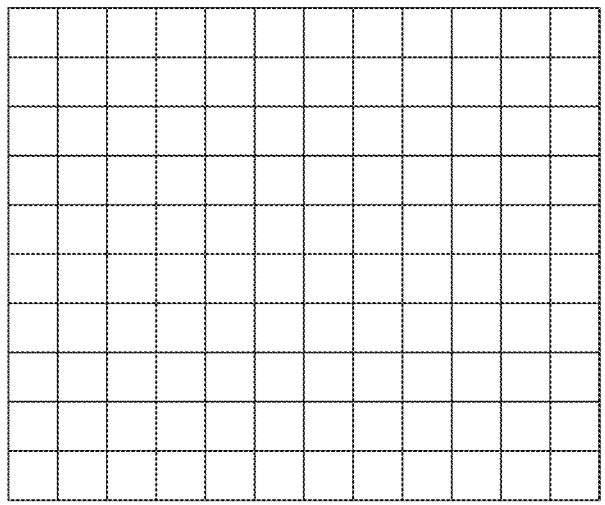
FIG. 1 illustrates an example of partitioning a video picture into multiple CTUs.

It will be readily understood that the components of the present invention, as generally described and illustrated in the figures herein, may be arranged and designed in a wide variety of different configurations. Thus, the following more detailed description of the embodiments of the systems and methods of the present invention, as represented in the figures, is not intended to limit the scope of the invention, as claimed, but is merely representative of selected embodiments of the invention.

Reference throughout this specification to "an embodiment", "some embodiments", or similar language means that a particular feature, structure, or characteristic described in connection with the embodiments may be included in at least one embodiment of the present invention. Thus, appearances of the phrases "in an embodiment" or "in some embodiments" in various places throughout this specification are not necessarily all referring to the same embodiment, these embodiments can be implemented individually or in conjunction with one or more other embodiments. Furthermore, the described features, structures, or characteristics may be combined in any suitable manner in one or more embodiments. One skilled in the relevant art will recognize, however, that the invention can be practiced without one or more of the specific details, or with other methods, components, etc. In other instances, well-known structures, or operations are not shown or described in detail to avoid obscuring aspects of the invention.

For the first two cases for the relationship between tiles and slices in the VVC standard, the tile partition inside the raster scan slices or rectangular slices contribute none or insufficient coding gain in coding efficiency. Even worse, the tile partition places several impositions to the encoding or decoding processing, for example, CTUs in a tile are processed according to a raster scan order within the tile, tile boundary checking is required for certain coding tools which consequently reduces the coding efficiency. In addition, rectangular slice based parallel processing is possible and may replace tile based parallel processing. For the third case for the relationship between tiles and slices, the impositions may include CTUs in a slice are processed in raster scan order, and slice boundary checking is required. In the third case, slice based parallel processing may also replaces tile based parallel processing. The tile partition outside the slices does not affect essential slice processing. The third case is actually motivated by the use cases with subpictures. In the use cases subpicture boundaries coincide with the tile boundaries and the subpicture boundary related processing overrides the tile boundary related processing. For further consideration of coding efficiency improvement regarding the picture partitioning structure, the following methods are provided in the present disclosure.

Method 1: Tile Boundaries Not Impose Constraints Various embodiments of the present invention improve the coding efficiency and reduce the system complexity by removing constraints caused by tile partitioning. In the embodiments of Method 1, tile boundaries may not impose constraints on processing across the tile boundaries, in other words, tile boundary related processing can be disabled during video encoding and decoding. Some examples of tile boundary related processing are edge checking or neighboring block availability checking for tile boundaries for Quantization Parameter (QP) derivation or Context-based Adaptive Binary Arithmetic Coding (CABAC) initialization, and loop filtering processing across tile boundaries. In some embodiments, a current picture is composed of multiple CTUs, and the current picture is divided by one or more tile columns and one or more tile rows. Each tile in the current picture is a rectangular region of CTUs within a particular tile column and a particular tile row in the current picture. Each CTU consists of an N×N block of luma samples and one or more corresponding blocks of chroma samples, for example each CTU consists of one luma CTB and two chroma CTBs. The current picture is also partitioned into multiple raster scan slices or rectangular slices according to various embodiments. In some embodiments, the rater scan slices in the current picture are formed by including multiple consecutive tiles in a raster scan order, and the rectangular slices in the current picture are formed by dividing the current picture into rectangular regions each containing multiple complete tiles. In some other embodiments, the slice boundaries are not necessary to be coincided with the tile boundaries, where the raster scan slices in the current picture are formed by including multiple consecutive CTUs in a raster scan order within a slice, and the rectangular slices in the current picture are formed by dividing the current picture into rectangular regions each containing multiple complete CTUs in a raster scan order within a slice. Each of the raster scan slices is specified based on a number of consecutive CTUs in the current picture according to one embodiment, and each of the rectangular slices is specified based on a grid with a grid column width and a grid row height in the unit of tiles according to another embodiment.

In another embodiment of rectangular slices, each of the rectangular slices is specified based on a grid with a grid column width and a grid row height in the unit of CTUs. The current picture may also include multiple subpictures according to some embodiments, and each subpicture has one or more complete slices. Subpicture boundary related processing overrides the processing for the coinciding slice boundaries according to some embodiments of the present invention. In the VVC standard, parallel processing is based on tile partitions when Wavefront Parallel Processing (WPP) is enabled. In various embodiments of the present invention, parallel processing is based on subpicture or rectangular slice partitions.

In some embodiments, tile boundary related processing is adaptively enabled or disabled during video encoding and decoding according to a first flag signaled in a high level syntax set. In one embodiment, the first flag sps_no_use_tile_boundaries_flag for controlling the tile boundary related processing is signaled in or parsed from a Sequence Parameter Set (SPS). For example, this first flag sps_no_use_tile_boundaries_flag equals to 1 specifying the support of Method 1 is enabled, that is tile boundary related processing is disabled during encoding or decoding, whereas the first flag sps_no_use_tile_boundaries_flag equals to 0 specifying the support of Method 1 is disabled, that is tile boundary related processing can be enabled during encoding or decoding. In another example, the first flag sps_processing_across_tile_boundaries_flag is signaled in a SPS as shown in Table 4. This first flag equals to 1 specifying that the processing across tile boundaries is enabled, and the first flag equals to 0 specifying that the processing across tile boundaries is disabled.

TABLE 4

|  | Descriptor |
| --- | --- |
| seq_parameter_set_rbsp( ) { |  |
|   sps_seq_parameter_set_id | u(4) |
|   sps_video_parameter_set_id | u(4) |
|   sps_max_sublayers_minus1 | u(3) |
|   sps_reserved_zero_4bits | u(4) |
|   sps_ptl_dpb_hrd_params_present_flag | u(1) |
|   if( sps_ptl_dpb_hrd_params_present_flag ) |  |
|     profile_tier_level( 1, sps_max_sublayers_minus1 ) |  |
|   gdr_enabled_flag | u(1) |
|   chroma_format_idc | u(2) |
|   if( chroma_format_idc = = 3 ) |  |
|     separate_colour_plane_flag | u(1) |
|   res_change_in_clvs_allowed_flag | u(1) |
|   pic_width_max_in_luma_samples | ue (v) |
|   pic_height_max_in_luma_samples | ue (v) |
|   sps_conformance_window_flag | u(1) |
|   if( sps_conformance_window_flag ) { |  |
|     sps_conf_win_left_offset | ue (v) |
|     sps_conf_win_right_offset | ue (v) |
|     sps_conf_win_top_offset | ue (v) |
|     sps_conf_win_bottom_offset | ue (v) |
|   } |  |
|   sps_log2_ctu_size_minus5 | u(2) |
|   subpic_info_present_flag | u(1) |
|   ... |  |
|   sps_processing_across_tile_boundaries_flag | u(1) |
|   ... |  |

In this embodiment, a second flag loop_filter_across_tiles_enabled_flag is adaptively signaled in a Picture Parameter Set (PPS) as shown in Table 5 according to a value of the first flag sps_processing_across_tile_boundaries_flag signaled in the associated SPS. In-loop filtering operations may be performed across tile boundaries in pictures referring to the PPS when this second flag is equal to 1, whereas the in-loop filtering operations are not performed across tile boundaries in pictures referring to the PPS when this second flag is equal to 0. Some examples of the in-loop filtering operations are one or a combination of the deblocking filter, sample adaptive offset filter, and adaptive loop filter operations. The default value of the second flag loop_filter_across_tiles_enabled_flag is inferred to be equal to 0 when it is not present.

TABLE 5

|  | Descriptor |
| --- | --- |
| pic_parameter_set_rbsp( ) { |  |
|   pps_pic_parameter_set_id | ue(v) |
|   ... |  |
|   no_pic_partition_flag | u(1) |
|   if( !no_pic_partition_flag ) { |  |
|     pps_log2_ctu_size_minus5 | u(2) |
|     ... |  |
|     if( sps_processing_across_tile_boundaries_flag ) |  |
|       loop_filter_across_tiles_enabled_flag | u(1) |
|       loop_filter_across_slices_enabled_flag | u(1) |
|   } |  |
|   ... |  |

In this embodiment of signaling the first flag sps_processing_across_tile_boundaries_flag in the SPS, tile boundary related processing are modified accordingly. For example, the neighboring block availability availableN is derived according to this first flag. The neighboring block availability availableN for a current block is set equal to FALSE if one or more of the following eight conditions are true, otherwise availableN for the current block is set to equal to TRUE when all of the eight conditions are false. The eight conditions include: xNbY is less than 0, xNbY is less than 0, xNbY is greater than or equal to pic_width_in_luma_samples, yNbY is greater than or equal to pic_height_in_luma_samples, IsAvailble[cIdx][xNbY][yNbY] is equal to FALSE, the neighboring block is contained in a different slice than the current block, the neighboring block is contained in a different tile than the current block and the first flag sps_processing_across_tile_boundaries_flag is equal to 1, and sps_entropy_coding_sync_enabled_flag is equal to 1 and (xNbY>>CtbLog2SizeY) is greater than or equal to (xCurr>>CtbLog2SizeY)+1. The neighboring block availability availableN is set equal to FALSE when all of the following three conditions are true: checkPredModeY is equal to TRUE, availableN is set equal to TRUE, and CuPredMode[0][xNbY][yNbY] is not equal to CuPredMode[0][xCurr][yCurr].

In another example, a variable for quantization parameters $qP_{Y\_PREV}$ is derived according to the first flag sps_processing_across_tile_boundaries_flag. This variable $qP_{Y\_PREV}$ is set equal to a slice default vale $SliceQp_Y$ if one or more of the following conditions are true. The conditions include: the current quantization group is the first quantization group in a slice, the current quantization group is the first quantization group in a tile and the first flag sps_processing_across_tile_boundaries_flag is equal to 1, and the current quantization group is the first quantization group in a Coding Tree Block (CTB) row of a tile and sps_entropy_coding_sync_enabled_flag is equal to 1. The variable is set equal to a luma quantization parameter $Qp_Y$ of the last luma coding unit in the previous quantization group in a decoding order.

A CABAC initialization process is invoked when starting to parse the CTU syntax and one or more of the following conditions are true: the CTU is the first CTU in a slice, the CTU is the first CTU in a tile and the first flag sps_processing_across_tile_boundaries_flag is equal to 1, and the value of sps_entropy_coding_sync_enabled_flag is equal to 1 and the CTU is the first CTU in a CTU row of a tile and the first flag sps_processing_across_tile_boundaries_flag is equal to 1.

Figure 2:
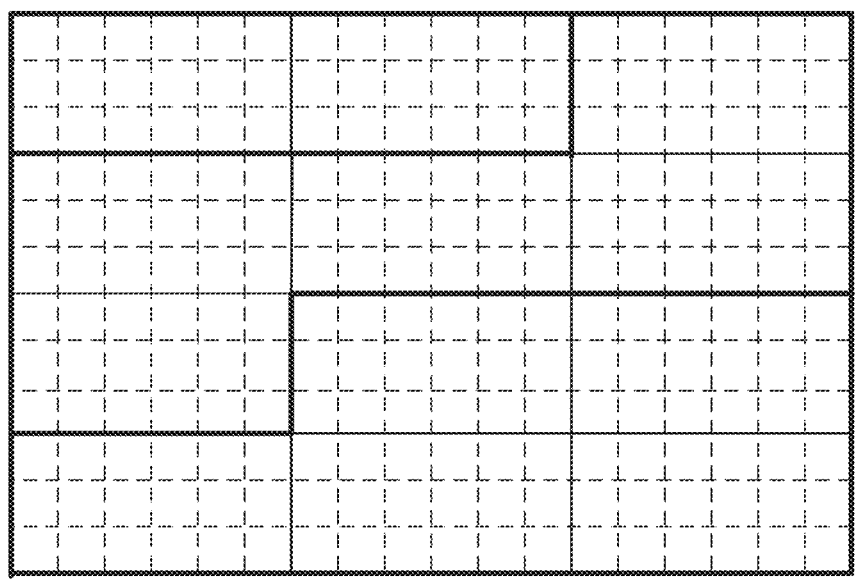
FIG. 2 illustrates an example of applying raster scan slice partitioning to divide a picture into 12 tiles and 3 raster scan slices.
Figure 3:
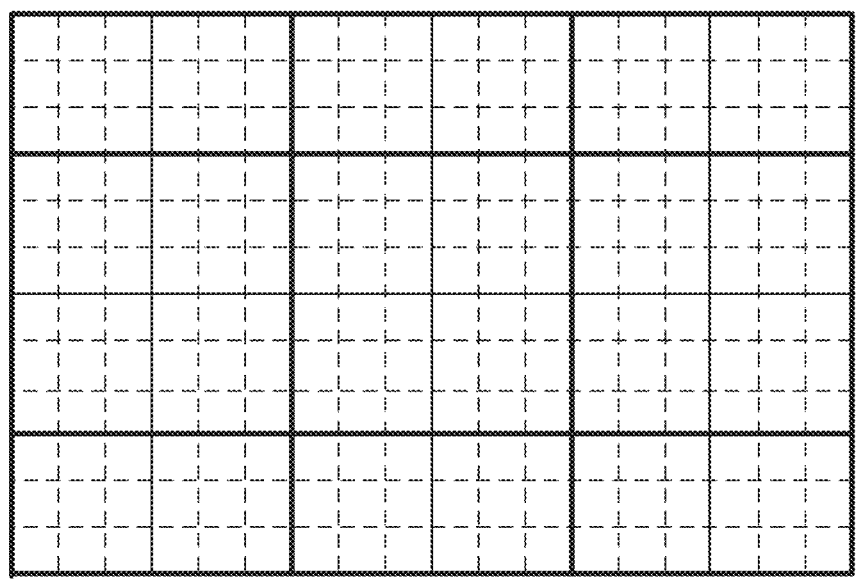
FIG. 3 illustrates an example of applying rectangular slice partitioning to divide a picture, into 24 tiles and 9 rectangular slices.
Figure 4:
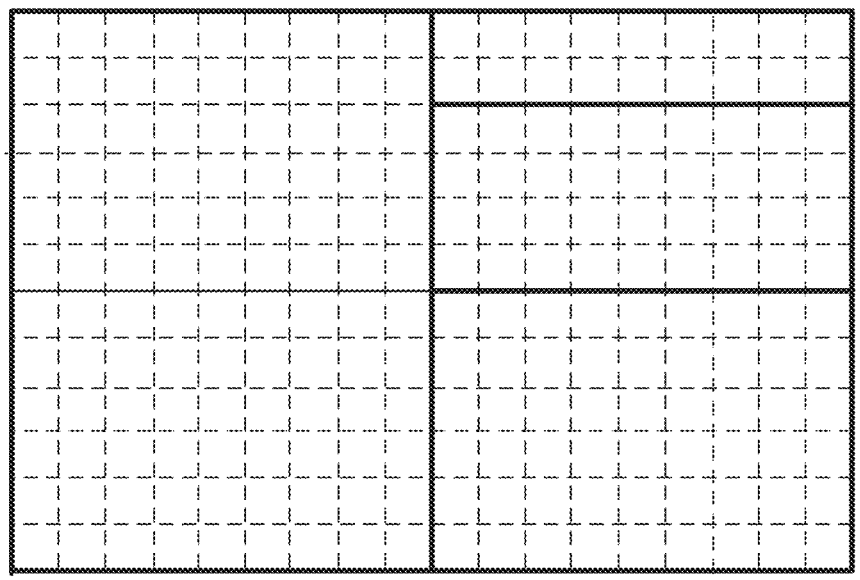
FIG. 4 illustrates an example of partitioning a picture into 4 tiles and 4 rectangular slices.
Figure 5:
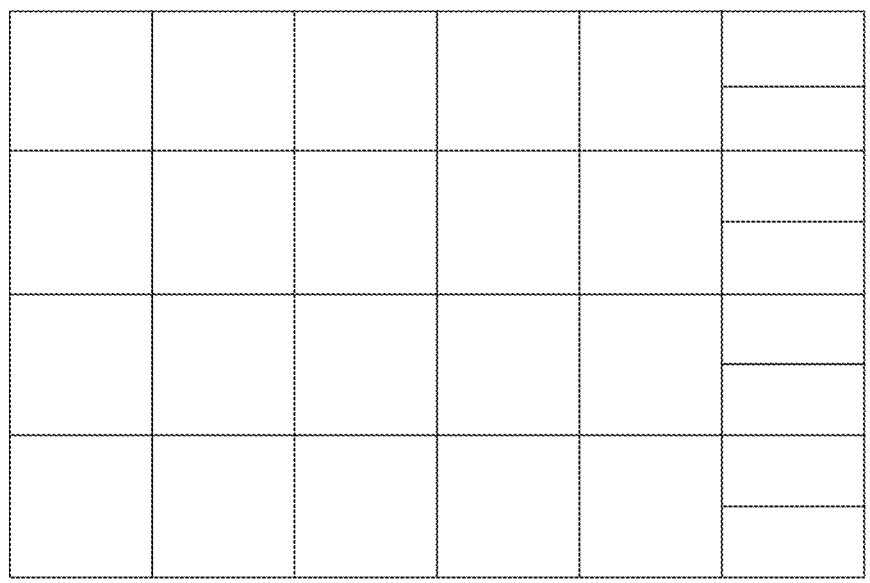
FIG. 5 illustrates an example of partitioning a picture into 28 subpictures.
Figure 6A:
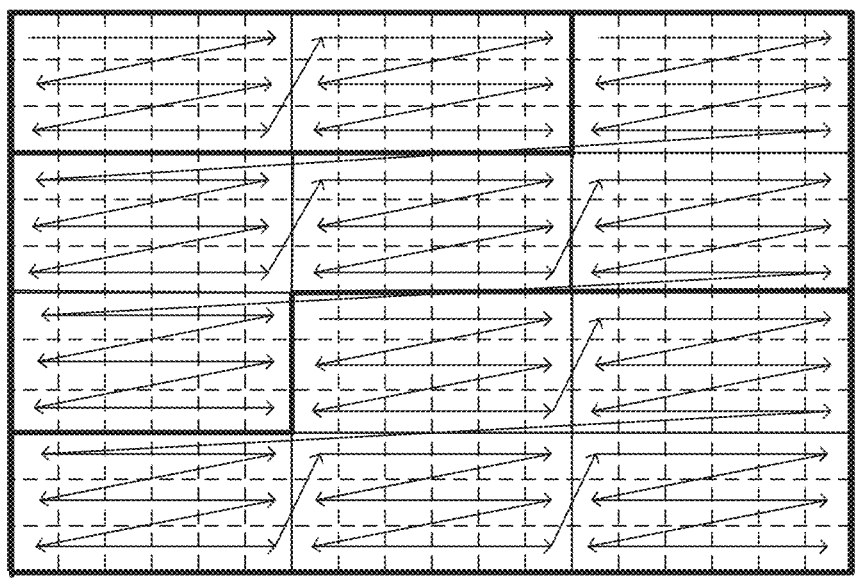
FIG. 6A illustrates a conventional processing order for encoding or decoding a picture partitioned in raster scan slices.
Figure 6B:
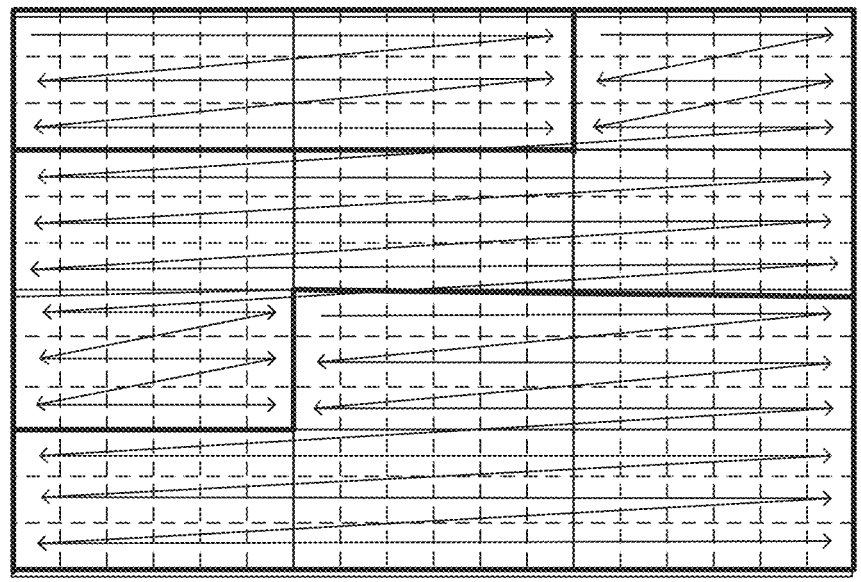
FIG. 6B illustrates a processing order for encoding or decoding a picture partitioned in raster scan slices according to an embodiment of the present invention.
Figure 7A:
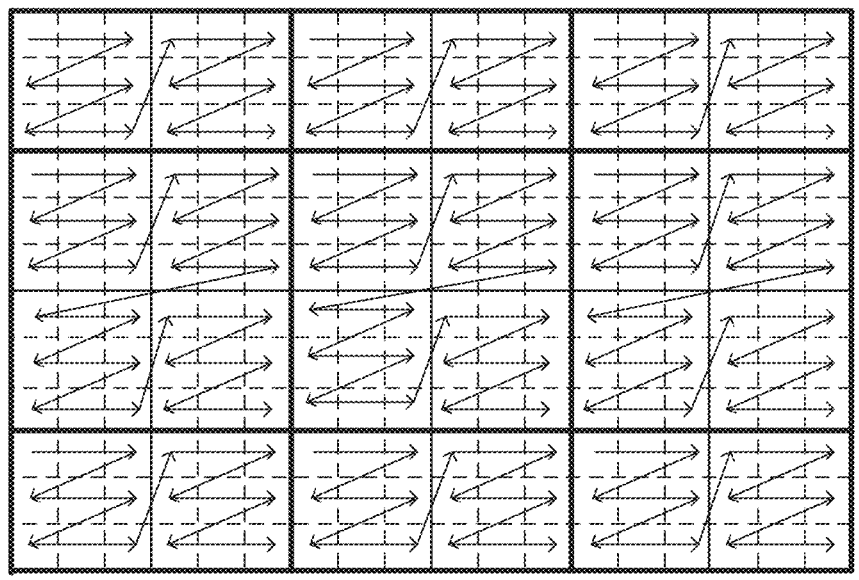
FIG. 7A illustrates a conventional processing order for encoding or decoding a picture partitioned in rectangular slices.
Figure 7B:
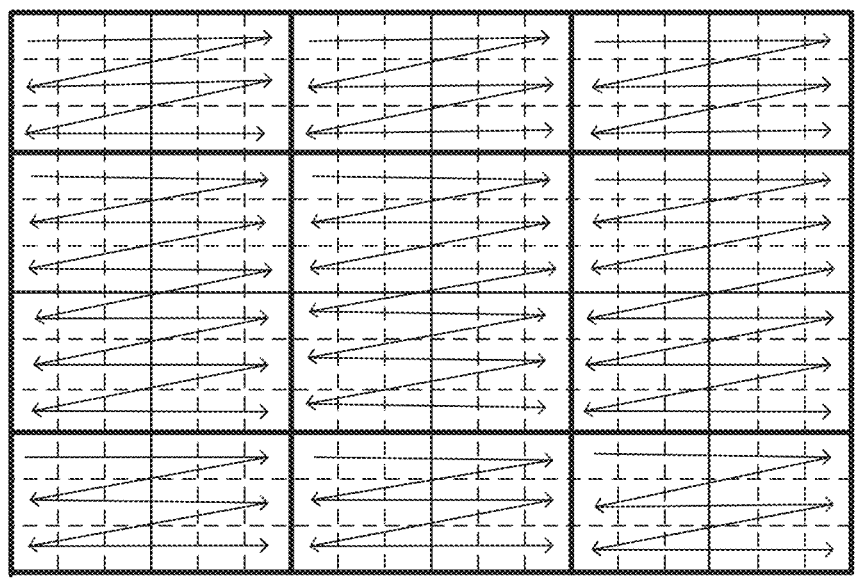
FIG. 7B illustrates a processing order for encoding or decoding a picture partitioned in rectangular slices according to an embodiment of the present invention.

Method 2: Tile Partition only used as Partition Grid In some embodiments according to Method 2, there is no additional flag used to disable tile boundary related processing as tile boundary constraints are removed once slice layout is specified. Tile partition is used as a partition grid for slice layout only in embodiments of Method 2. CTUs in each slice are encoded or decoded by always processing in a raster scan order according to embodiments of the present invention. FIG. 6A illustrates a conventional processing order for encoding or decoding CTUs in the picture divided by 12 tiles within 3 raster scan slices as shown in FIG. 2, where the CTUs in each slice are processed by one tile after another, and the CTUs in each tile are processed by a raster scan order. FIG. 6B illustrates a processing order for encoding or decoding the same picture as shown in FIG. 2 according to an embodiment of the present invention. The CTUs in each slice shown in FIG. 6B are processed in a raster scan order regardless the tile partition. FIG. 7A illustrates a conventional processing order for encoding or decoding CTUs in the picture divided by 24 tiles within 9 rectangular slices as shown in FIG. 3, where the CTUs in each rectangular slice are processed by one tile after another, and the CTUs in each tile are processed by a raster scan order. FIG. 7B illustrates a processing order for encoding or decoding the same picture as shown in FIG. 3 according to an embodiment of the present invention. The CTUs in each rectangular slice shown in FIG. 7B are processed in a raster scan order regardless the tile partition.

By implementing embodiments of Method 2, the flag loop_filter_across_tile_enabled_flag is removed from the PPS as shown in Table 6 as all tile boundaries are not considered during encoding and decoding. Tile boundary related processing such as in-loop filtering operations across tile boundaries is always disabled according to embodiments complying Method 2.

TABLE 6

| | Descriptor |
|---|---|
| pic_parameter_set_rbsp( ) { | |
|   pps_pic_parameter_set_id | ue(v) |
|   ... | |

TABLE 6-continued

| | Descriptor |
|---|---|
|   no_pic_partition_flag | u(1) |
|   if( !no_pic_partition_flag ) { | |
|     pps_log2_ctu_size_minus5 | u(2) |
|     ... | |
|     ~~loop_filter_across_tiles_enabled_flag~~ | ~~u(1)~~ |
|     loop_filter_across_slices_enabled_flag | u(1) |
|   } | |
| ... | |

There is no tile involved in the processing after slice layout is specified according to this embodiment, so derivation for CTU information is performed for each slice instead of for each tile, and the value of sps_entropy_coding_sync_enabled_flag is equal to 1 and the CTU is the first CTU in a CTU row of a rectangular slice for CABAC initialization when WPP is enabled.

Figure 8:
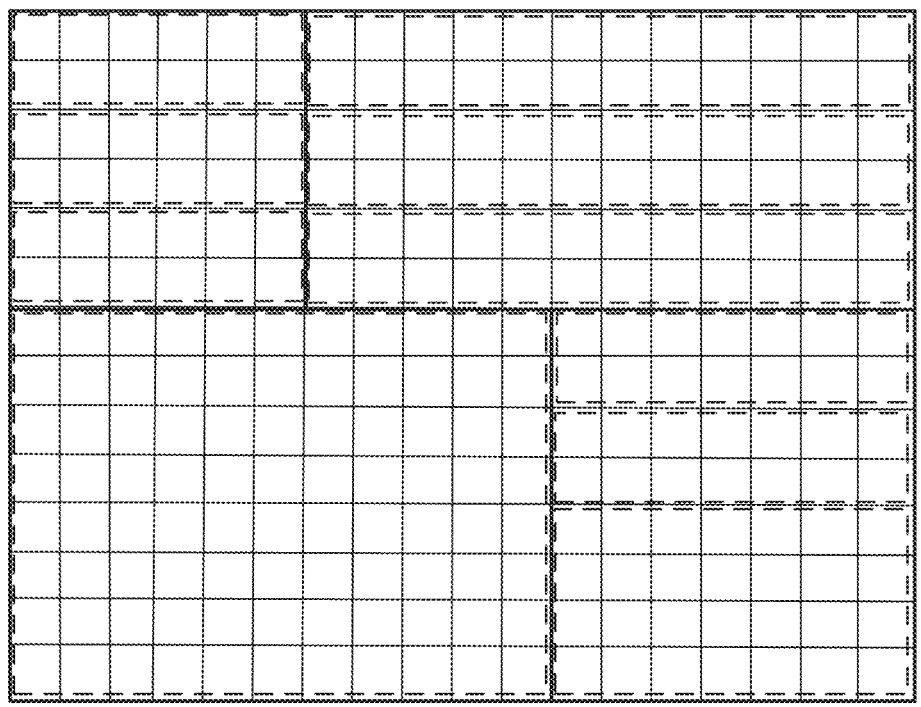
FIG. 8 illustrates an example of partitioning a picture into 10 rectangular slices and 5 subpictures.

Method 3: Tile Concept and Tile Partition are Removed In some other embodiments, the tile concept is completely removed so there is no tile boundary related processing in the encoding or decoding process including tile boundary checking and in-loop filtering across tile boundaries. All slices in a current picture are specified based on a grid with a grid column width and a grid row height in the unit of CTUs. In cases when the current picture is divided into multiple subpictures, where each subpictures is composed of one or more complete rectangular slices. Subpicture boundary related processing overrides the processing for the coinciding slice boundaries. Parallel processing is based on subpicture or rectangular slice partitions. FIG. 8 illustrates a current picture that is partitioned into 10 rectangular slices and 5 subpictures, where each grid in FIG. 8 is a CTU, dashed lines are slice boundaries, and solid lines are subpicture boundaries. The current picture in FIG. 8 is partitioned into 10 rectangular slices with slice sizes in the range of 12 to 88 CTUs and 5 subpictures of varying dimensions containing one to three slices. The grid column width and grid row height for the rectangular slices are counted based on CTUs instead of tiles. The definition of a slice in these embodiments is an integer number of CTUs in a raster scan order within a slice of a picture or a subpicture that are exclusively contained in a single NAL unit.

In an embodiment of partitioning a current picture into rectangular slices, syntax elements associated with the partition definition for rectangular slices are signaled in a PPS. The corresponding syntax structure for slices referring to the PPS is modified as shown in Table 7 to remove syntax elements related to tile partitioning.

TABLE 7

| | Descriptor |
|---|---|
| pic_parameter_set_rbsp( ) { | |
|   pps_pic_parameter_set_id | u(6) |
|   pps_seq_parameter_set_id | u(4) |
|   pps_mixed_nalu_types_in_pic_flag | u(1) |
|   pps_pic_width_in_luma_samples | ue(v) |
|   pps_pic_height_in_luma_samples | ue(v) |
|   ... | |
|   if( !pps_no_pic_partition_flag ) { | |
|     pps_log2_ctu_size_minus5 | u(2) |
|     ~~pps_num_exp_tile_columns_minus1~~ | ~~ue(v)~~ |
|     ~~pps_num_exp_tile_rows_minus1~~ | ~~ue(v)~~ |
|     ~~for( i = 0; i <= pps_num_exp_tile_columns_minus1; i++ )~~ | |
|       ~~pps_tile_column_width_minus1[ i ]~~ | ~~ue(v)~~ |
|     ~~for( i = 0; i <= pps_num_exp_tile_rows_minus1; i++ )~~ | |
|       ~~pps_tile_row_height_minus1[ i ]~~ | ~~ue(v)~~ |

TABLE 7-continued

| | Descriptor |
|---|---|
| ~~if( NumTilesInPic > 1 ) {~~ | |
| ~~pps_loop_filter_across_tiles_enabled_flag~~ | ~~u(1)~~ |
| ~~pps_rect_slice_flag~~ | ~~u(1)~~ |
| ~~}~~ | |
| pps_rect_slice_flag | u(1) |
| if( pps_rect_slice_flag ) | |
|   pps_single_slice_per_subpic_flag | u(1) |
| if( pps_rect_slice_flag && !pps_single_slice_per_subpic_flag ) { | |
|   pps_num_slices_in_pic_minus1 | ue(v) |
|   ~~if( pps_num_slices_in_pic_minus1 > 1 )~~ | |
|     ~~pps_tile_idx_delta_present_flag~~ | ~~u(1)~~ |
|   ~~for( i = 0; i < pps_num_slices_in_pic_minus1; i++ ) {~~ | |
|     ~~if( SliceTopLeftTileIdx[ i ] % NumTileColumns != NumTileColumns − 1 )~~ | |
|     ~~pps_slice_width_in_tiles_minus1[ i ]~~ | ~~ue(v)~~ |
|     ~~if( SliceTopLeftTileIdx[ i ] / NumTileColumns != NumTileRows − 1 &&~~ | |
|     ~~( pps_tile_idx_delta_present_flag  ||~~ | |
|     ~~SliceTopLeftTileIdx[ i ] % NumTileColumns == 0 ) )~~ | ~~ue(v)~~ |
|     ~~pps_slice_height_in_tiles_minus1[ i ]~~ | |
|     ~~if( pps_slice_width_in_tiles_minus1[ i ] == 0 &&~~ | |
|     ~~pps_slice_height_in_tiles_minus1[ i ] == 0 &&~~ | |
|     ~~RowHeightVal[ SliceTopLeftTileIdx[ i ] / NumTileColumns ] > 1 ) {~~ | |
|     ~~pps_num_exp_slices_in_tile[ i ]~~ | ~~ue(v)~~ |
|     ~~for( j = 0; j < pps_num_exp_slices_in_tile[ i ]; j++ )~~ | |
|     ~~pps_exp_slice_height_in_ctus_minus1[ i ][ j ]~~ | ~~ue(v)~~ |
|     ~~i += NumSlicesInTile[ i ] − 1~~ | |
|     ~~}~~ | |
|     ~~if( pps_tile_idx_delta_present_flag && i < pps_num_slices_in_pic_minus1 )~~ | |
|     ~~pps_tile_idx_delta_val[ i ]~~ | ~~se(v)~~ |
|   ~~}~~ | |
|   if( pps_num_slices_in_pic_minus1 > 0 ) | |
|     pps_slice_same_size_flag | u(1) |
|   for( i = 0; pps_num_slices_in_pic_minus1 > 0 && | |
|     i <= pps_num_slices_in_pic_minus1; i++ ) { | |
|     if( !pps_slice_same_size_flag || i == 0 ) { | |
|       if( i > 0 && pps_pic_width_in_luma_samples > CtbSizeY ) | |
|         pps_slice_ctu_top_left_x[ i ] | u(v) |
|       if( i > 0 && pps_pic_height_in_luma_samples > CtbSizeY ) | |
|         pps_slice_ctu_top_left_y[ i ] | u(v) |
|       if( i < num_slices_in_pic_minus1 && | |
|         pps_pic_width_in_luma_samples > CtbSizeY ) | |
|         pps_slice_width_minus1[ i ] | u(v) |
|       if( i < pps_pic_width_in_luma_samples && | |
|         pps_pic_height_in_luma_samples > CtbSizeY ) | |
|         pps_slice_height_minus1[ i ] | u(v) |
|     } | |
|   } | |
|   if( !pps_rect_slice_flag || pps_single_slice_per_subpic_flag || | |
|     pps_num_slices_in_pic_minus1 > 0 ) | |
|     pps_loop_filter_across_slices_enabled_flag | u(1) |
| } | |
| ... | |
| pps_picture_header_extension_present_flag | u(1) |
| pps_slice_header_extension_present_flag | u(1) |
| pps_extension_flag | u(1) |
| if( pps_extension_flag ) | |
|   while( more_rbsp_data( ) ) | |
|     pps_extension_data_flag | u(1) |
| rbsp_trailing_bits( ) | |
| } | |
| } | |

The syntax element pps_slice_same_size_flag signaled in the PPS is used to specify whether all slices in the picture referring to the PPS have the same width and the same height. The width is specified by pps_slice_width_minus1[0] and the height is specified by pps_slice_height_minus1[0] when this syntax element pps_slice_same_size_flag is equal to 1, whereas the width and height do not impose such a constraint. The value of pps_slice_same_size_flag is inferred to be equal to 0 when this syntax element is not present. The structure for partitioning the picture into rectangular slices is defined by syntax elements related to a position of a top-left CTU for each slice in the unit of CTUs, a slice width and slice height for each slice in the unit of CTUs. The syntax element pps_slice_ctu_top_left_x[i] specifies a horizontal position of the top left CTU of the i-th slice in the unit of CtbSizeY. The length of the syntax element is Ceil(Log 2(tmpWidthVal)) bits, where the variable tmpWidthVal is set equal to (pps_pic_width_in_luma_samples+CtbSizeY−1)/CtbSizeY. When pps_slice_ctu_top_left_x[i] is not present, the value of this syntax element is inferred to be equal to 0 if pps_slice_same_size_flag is equal to 0 or i is equal to 0, otherwise, the value of pps_slice_ctu_top_left_x[i] is inferred to be equal to (i % numSliceCols)*(pps_slice_width_minus1[0]+1). When pps_slice_same_size_flag is equal to 1, the variable numSliceCols, specifying the number of slice columns in each picture referring to the PPS, is derived by: numSliceCols=tmpWidthVal/(pps_slice_width_minus1[0]+1). When pps_slice_same_size_flag is equal to 1, the value of numSliceCols*tmpHeightVal/(pps_slice_height_minus1[0]+1)−1 shall be equal to pps_num_slices_minus1. The syntax element pps_slice_ctu_top_left_y[i] specifies a vertical position of the top left CTU of the i-th slice in the unit of CtbSizeY. The length of the syntax element is Ceil(Log 2(tmpHeightVal)) bits, where the variable tmpHeightVal is set equal to (pps_pic_height_in_luma_samples+CtbSizeY−1)/CtbSizeY. When this syntax element is not present, the value of pps_slice_ctu_top_lefty[i] is inferred to be equal to 0 if pps_slice_same_size_flag is equal to 0 or i is equal to 0, otherwise, the value of pps_slice_ctu_top_lefty[i] is inferred to be equal to (i/numSliceCols)*(pps_slice_height_minus1[0]+1). The value of the syntax element pps_slice_width_minus1[i] plus 1 specifies the width of the i-th slice in the units of CtbSizeY. The length of the syntax element is Ceil(Log 2(tmpWidthVal)) bits. When this syntax element is present, the value of pps_slice_width_minus1[i] is inferred to be equal to tmpWidthVal−pps_slice_ctu_top_left_x[i]−1 if pps_slice_same_size_flag is equal to 0 or i is equal to 0, otherwise, the value of pps_slice_width_minus1[i] is inferred to be equal to pps_slice_width_minus1[0]. The value of tmpWidthVal % (pps_slice_width_minus1[0]+1) shall be equal to 0 when pps_slice_same_size_flag is equal to 1. Similarly, the value of the syntax element pps_slice_height_minus1[i] plus 1 specifies the height of the i-th slice in the unit of CtbSizeY. The length of the syntax element is Ceil(Log 2(tmpHeightVal)) bits. When this syntax element is not present, the value of pps_slice_height_minus1[i] is inferred to be equal to tmpHeightVal−pps_slice_ctu_top_lefty[i]−1 if pps_slice_same_size_flag is equal to 0 or i is equal to 0, otherwise, the value of pps_slice_height_minus1[i] is inferred to be equal to pps_slice_height_minus1[0]. When pps_slice_same_size_flag is equal to 1, the value of tmpHeightVal % (pps_slice_height_minus1[0]+1) shall be equal to 0.

It is a requirement of bitstream conformance that the shapes of the slices shall be such that each slice, when decoded, shall have its entire left boundary and entire top boundary consisting of picture boundaries or consisting of boundaries of previously decoded slices.

Figure 9:
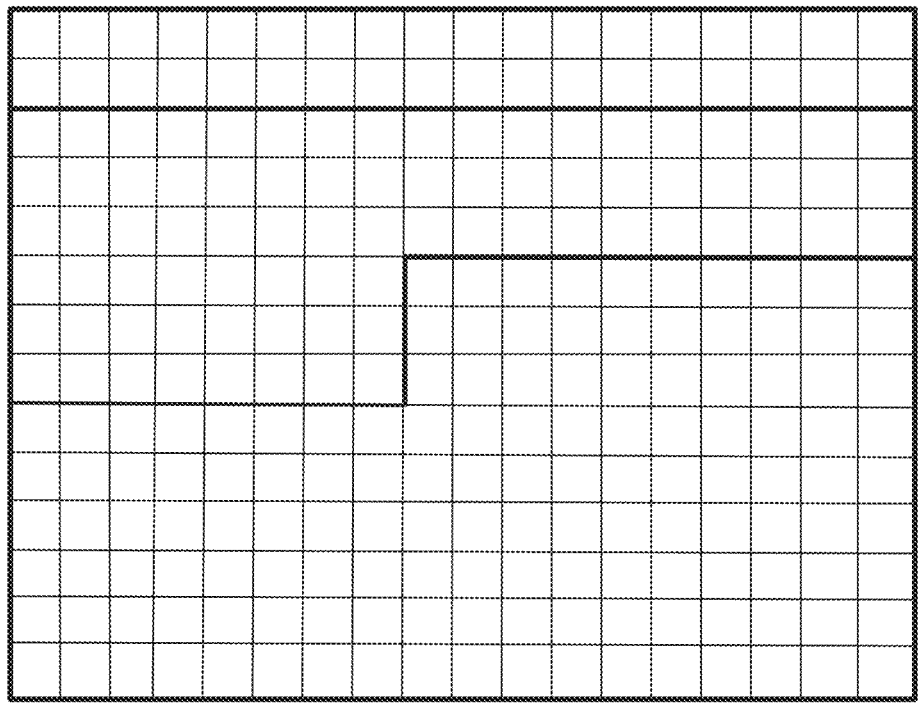
FIG. 9 illustrates an example of partitioning a picture into 3 raster scan slices.

In embodiments of partitioning a current picture into raster scan slices, each slices is specified in terms of a number of CTUs in the slice. FIG. 9 illustrates a picture that is partitioned into 3 raster scan slices. Syntax elements associated with the partition definition for raster scan slices are signaled in slice headers, for example the syntax elements include a raster scan CTU index of a first CTU in each slice and a number of CTUs in each slice. The corresponding syntax structure for a raster scan slice as shown in Table 8 is modified according to one embodiment of the present invention.

TABLE 8

| | Descriptor |
|---|---|
| slice_header( ) { | |
|   sh_picture_header_in_slice_header_flag | u(1) |
|   if( sh_picture_header_in_slice_header_flag ) | |
|     picture_header_structure( ) | |

TABLE 8-continued

| | Descriptor |
|---|---|
|   if( sps_subpic_info_present_flag ) | |
|     sh_subpic_id | u(v) |
|   if( ( pps_rect_slice_flag && NumSlicesInSubpic[ CurrSubpicIdx ] > 1 ) ‖ | |
|     ( !pps_rect_slice_flag ~~&& NumTilesInPic > 1~~ ) ) | |
|     sh_slice_address | u(v) |
|   for( i = 0; i < NumExtraShBits; i++ ) | |
|     sh_extra_bit[ i ] | u(1) |
|   if( !pps_rect_slice_flag && ~~NumTilesInPic~~ PicSizeInCtbsY − sh_slice_address > 1 ) | |
|     sh_num_ctus~~tiles~~_in_slice_minus1 | ue(v) |
|   if( ph_inter_slice_allowed_flag ) | |
|     sh_slice_type | ue(v) |
| ... | |
|   if( NumEntryPoints > 0 ) { | |
|     sh_entry_offset_len_minus1 | ue(v) |
|     for( i = 0; i < NumEntryPoints; i++ ) | |
|       sh_entry_point_offset_minus1[ i ] | u(v) |
|   } | |
|   byte_alignment( ) | |
| } | |

The syntax element sh_slice_address signaled in the slice header of a raster scan slice specifies the slice address of the raster scan slice. When this syntax element is not present, the value of sh_slice_address is inferred to be equal to 0. In cases when pps_rect_slice_flag is equal to 0, the slice address is the raster scan CTU index of the first CTU in the slice, the length of sh_slice_address is Ceil(Log 2 (PicSizeInCtbsY)) bits, and the value of sh_slice_address shall be in the range of 0 to PicSizeInCtbsY−1, inclusively. In cases when pps_rect_slice_flag is equal to 1, the slice address is the subpicture-level slice index of the current slice SubpicLevelSliceIdx[j], where j is the picture-level slice index of the current slice, the length of sh_slice_address is Ceil(Log 2(NumSliceInSubpic[CurrSubpicIdx])) bits, and the value of sh_slice_address shall be in the range of 0 to NumSliceInSubpic[CurrSubpicIdx]−1, inclusively. It is a requirement of bitstream conformance that the following constraints are applied. The value of sh_slice_address shall not be equal to the value of sh_slice_address of any other coded slice NAL unit of the same coded picture if pps_rect_slice_flag is equal to 0 or sps_sub_pic_info_present_flag is equal to 0. Otherwise, the pair of sh_subpic_id and sh_slice_address values shall not be equal to the pair of sh_subpic_id and sh_slice_address values of any other coded slice NAL unit of the same coded picture. The shapes of the slices of a picture shall be such that each CTU, when decoded, shall have its entire left boundary and entire top boundary consisting of a picture boundary or consisting of boundaries of previously decoded CTU(s). The value of the syntax element sh_num_ctus_in_slice_minus1 plus 1 specifies the number of CTUs in the slice. The value of sh_num_ctus_in_slice_minus1 shall be in the range of 0 to PicSizeInCtbsY−1, inclusively. The value of sh_num_ctus_in_slice_minus1 shall be inferred to be equal to 0 when this syntax element is not present in the slice header. The end of tile related processing is no longer needed. Some exemplar tile related processing in the decoding process are modified with rectangular slices accordingly.

By implementing the embodiments of Method 3, all the tile boundary related processing are not performed, some examples of the modifications are described in the following. The derivation of neighboring block availability availableN for a current block does not check whether the neighboring block is contained in a different tile than the current block. The neighboring block availability availableN is set equal to FALSE if one or more of the following conditions are true: xNbY is less than 0, yNbY is less than 0, xNbY is greater than or equal to pps_pic_width_in_luma_samples, yNbY is greater than or equal to pps_pic_height_in_luma_samples, (xNbY>>CtbLog2SizeY) is greater than (xCurr>>CtbLog2SizeY) and (yNbY>>CtbLog2SizeY) is greater than or equal to (yCurr>>CtbLog2SizeY), (yNbY>>CtbLog2SizeY) is greater than or equal to (yCurr>>CtbLog2SizeY)+1, IsAvailable[cIdx][xNbY][yNbY] is equal to FALSE, the neighboring block is contained in a different slice than the current block, and sps_entropy_coding_sync_enabled_flag is equal to 1 and (xNbY>>CtbLog2SizeY) is greater than or equal to (xCurr>>CtbLog2SizeY)+1. Otherwise, the neighboring block availability availableN is set equal to TRUE. In cases when both checkPredModeY is equal to TRUE and CuPredMode[0][xNbY][yNbY] is not equal to CuPredMode[0][xCurr][yCurr], the neighboring block availability availableN is set equal to FALSE.

In another example, the condition of whether the current quantization group is the first quantization group in a tile is irrelevant in the derivation process for quantization parameters. The predicted luma quantization parameter $qP_{Y\_PREV}$ is derived by the following ordered steps. In the first step, a variable $qP_{Y\_PREV}$ is set equal to $SliceQp_Y$ if the current quantization group is the first quantization group in a slice. The derivation process for quantization parameters does not check whether the current quantization group is the first quantization group in a tile. The variable $qP_{Y\_PREV}$ is set equal to the luma quantization parameter $Qp_Y$ of the last luma coding unit in the previous quantization group in a decoding order. In one step, the predicted luma quantization parameter $qP_{Y\_PREV}$ is derived as follows. The predicted luma quantization parameter $qP_{Y\_PREV}$ is set equal to the luma quantization parameter $Qp_Y$ of the coding unit containing the luma coding block covering (xQg, yQg−1) if availableB is equal to TRUE and the current quantization group is the first quantization group in a CTB row within a slice. Otherwise, the predicted luma quantization parameter $qP_{Y\_PREV}$ is derived by: $qP_{Y\_PREV}=(qP_{Y\_A}+qP_{Y\_B}+1)>>1$.

In a conventional deblocking filter process, tile boundary checking are performed when a syntax element pps_loop_filter_across_tile_enabled_flag indicates in-loop filter is applied across tile boundaries. In an example of removing the tile partition according to various embodiment of the present invention, the encoding or decoding system does not perform any tile boundary checking in the in-loop filtering process such as the deblocking filter process.

Tiles used in the CABAC initialization process and tile based WPP may be replaced by the rectangular slices. The CABAC initialization process is invoked when starting the parsing of the CTU syntax and at least one of the conditions is true: the CTU is the first CTU in a slice and the value of sps_entropy_coding_sync_enabled_flag is equal to 1 and the CTU is the first CTU in a CTU row of a rectangular slice. The CABAC initialization process does not check whether the CTU is the first CTU in a tile according to various embodiments of the present invention. The storage process for context variables is applied as follows: sps_entropy_coding_sync_enabled_flag is equal to 1, and CtbAddrX is equal to the address of the first CTB of a row of CTBs in each rectangular slice when ending the parsing of the CTU syntax, and the storage process for context variables is invoked with TableStateIdx0Wpp and TableStateIdx1Wpp are outputs. In cases when sps_palette_enabled_flag is equal to 1, the storage process for palette predictor is applied as follows: when ending the parsing of the CTU syntax and the decoding process of the last CU in the CTU, sps_entropy_coding_sync_enabled_flag is equal to 1 and CtbAddrX is equal to the address of the first CTB of a row of CTBs in each rectangular slice, the storage process for palette predictor is invoked. The syntax element sps_entropy_coding_sync_enabled_flag equals to 1 specifying that a specific synchronization process for context variables is invoked before decoding the CTU that includes the first CTB of a row of CTBs in each rectangular slice in each picture referring to the SPS, and a specific storage process for context variables is invoked after decoding the CTU that includes the first CTB of a row of CTBs in each rectangular slice in each picture referring to the SPS. The syntax element sps_entropy_coding_sync_enabled_flag equals to 0 specifying that no specific synchronization process for context variables is required to be invoked before decoding the CTU that includes the first CTB of a row of CTBs in each rectangular slice in each picture referring to the SPS, and no specific storage process for context variables is required to be invoked after decoding the CTU that includes the first CTB of a row of CTBs in each rectangular slice in each picture referring to the SPS. WPP is enabled when this syntax element sps_entropy_coding_sync_enabled_flag is equal to 1. The syntax element sps_entry_point_offsets_present_flag equals to 1 specifying that signaling for entry point offsets for rectangular slices or rectangular slice-specific CTU rows could be present in the slice headers of pictures referring to the SPS. The syntax element sps_entry_point_offsets_present_flag equals to 0 specifying that signaling for entry point offsets for rectangular slices or rectangular slice-specific CTU rows are not present in the slice headers of pictures referring to the SPS.

The above proposed rectangular slice syntax structure in the PPS may be placed in the SPS when all slices in the pictures within a CLVS do not change. As an embodiment in this case, the subpicture syntax structure may be simplified by looping over the number of slices with a subpicture index and subpicture ID.

Figure 10:
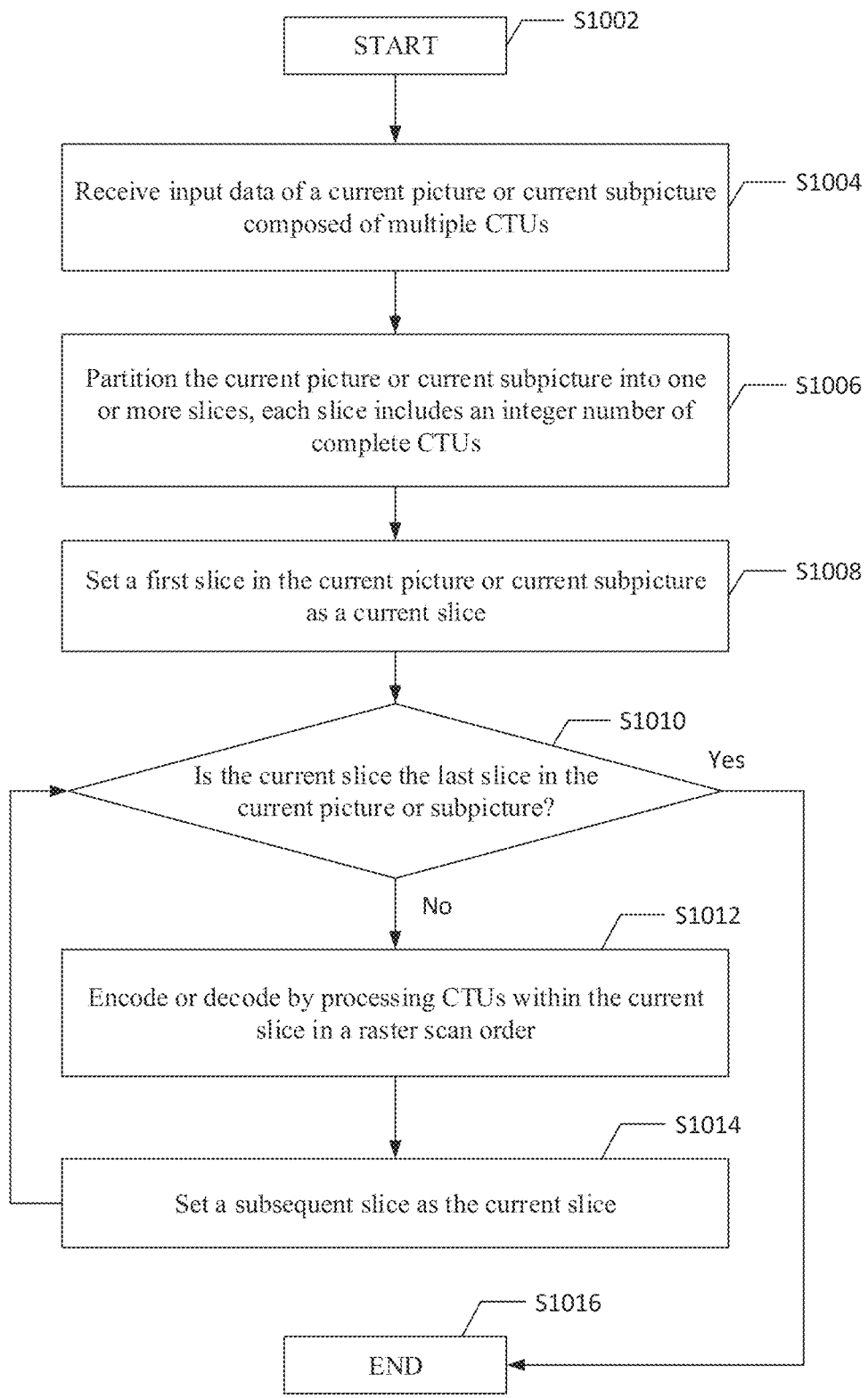
FIG. 10 is a flowchart of processing video data in CTU scan order by removing tile concept according to an embodiment of the present invention.

Representative Flowchart for Video Coding FIG. 10 is a flowchart illustrating an embodiment of a video encoding or decoding system processing input data by removing tile boundary constraints. In step S1002, the video encoding or decoding system starts encoding or decoding a current picture or a current subpicture of video data. The video encoding or decoding system receives input data associated with the current picture or current subpicture composed of multiple CTUs in step S1004. Each CTU consists of an N×N block of luma samples and one or more corresponding blocks of chroma samples. The current picture or current subpicture is partitioned into one or more slices in step S1006. Each slice includes an integer number of complete CTUs in the current picture that are exclusively contained in a single NAL unit. The slices are raster scan slices formed by including multiple consecutive CTUs in a raster scan order according to one embodiment, and the slices are rectangular slices formed by dividing the current picture into rectangular regions each containing multiple complete CTUs according to another embodiment. A first slice in the current picture or the current subpicture is set as a current slice in step S1008. The video encoding or decoding system checks if the current slice is the last slice in the current picture or current subpicture in step S1010. If the current slice is not the last slice, the video encoding or decoding system encodes or decodes the current slice by always processing CTUs within the current slice in a raster scan order in step S1012. Tile boundary related processing such as edge checking and neighboring block availability checking for tile boundaries for QP derivation and CABAC initialization, and loop filtering processing across tile boundaries will not performed in step S1012. After processing the current slice in step S1012, a subsequent slice is set as the current slice in step S1014, and proceed to step S1010. If the current slice is the last slice in the current picture or current subpicture, it is the end of encoding or decoding the current picture or current subpicture in step S1016.

Exemplary Video Encoder and Video Decoder Implementing Present Invention Embodiments of the present invention may be implemented in video encoders and/or video decoders. For example, the disclosed methods may be implemented in one or a combination of an entropy encoding module, an Inter, Intra, or prediction module, a transform module, or a deblocking module of a video encoder, and/or an entropy decoding module, an inverse deblocking module, an inverse transform module, an Inter, Intra, or prediction module of a video decoder. Alternatively, any of the disclosed methods may be implemented as a circuit coupled to the entropy encoding module, the Inter, Intra, or prediction module, the transform module, or the deblocking module of the video encoder and/or the entropy decoding module, the inverse deblocking module, the inverse transform module, the Inter, Intra, or prediction module of the video decoder, so as to provide the information needed by any of the modules. The video encoders have to follow the foregoing syntax design so as to generate a legal bitstream, and the video decoders are able to decode the bitstream correctly only if the parsing process is complied with the foregoing syntax design. When any syntax element is skipped in the bitstream, the video encoders and decoders define the value of the syntax element as an inferred value to guarantee the encoding and decoding results are matched.

Figure 11:
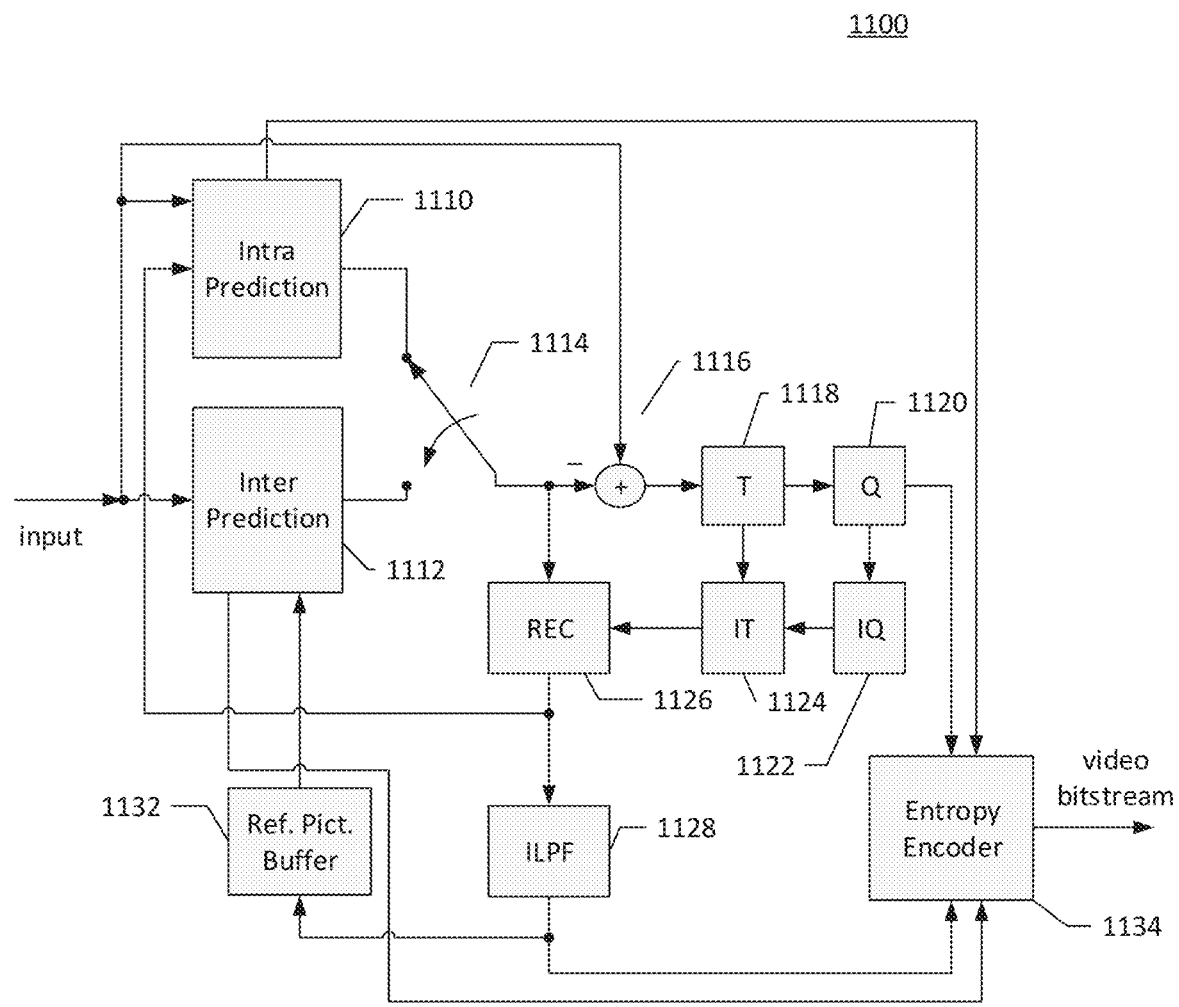
FIG. 11 illustrates an exemplary system block diagram for a video encoding system incorporating the video processing method according to embodiments of the present invention.

FIG. 11 illustrates an exemplary system block diagram for a Video Encoder 1100 implementing one or more of the various embodiments of the present invention. The video Encoder 1100 receives input video data of a current picture composed of multiple CTUs. Each CTU consists of one block of luma samples together with one or more corresponding blocks of chroma samples. The current picture is partitioned into one or more slices, each slice includes an integer number of complete CTUs in the current picture that are exclusively contained in a single NAL unit. An Intra Prediction module 1110 provides intra predictors based on reconstructed video data of the current picture. An Inter Prediction module 1112 performs Motion Estimation (ME) and Motion Compensation (MC) to provide inter predictors based on referencing video data from other picture or pictures. Either the Intra Prediction module 1110 or Inter Prediction module 1112 supplies a selected predictor of a current block in the current picture using a switch 1114 to an Adder 1116 to form residues by subtracting the selected predictor from original video data of the current block. The residues of the current block are further processed by a Transformation module (T) 1118 followed by a Quantization module (Q) 1120. The transformed and quantized residual signal is then encoded by Entropy Encoder 1134 to form a video bitstream. The transformed and quantized residual signal of the current block is processed by an Inverse Quantization module (IQ) 1122 and an Inverse Transformation module (IT) 1124 to recover the prediction residues. As shown in FIG. 11, the residues are recovered by adding back to the selected predictor at a Reconstruction module (REC) 1126 to produce reconstructed video data. The reconstructed video data may be stored in a Reference Picture Buffer (Ref. Pict. Buffer) 1132 and used for prediction of other pictures. The reconstructed video data from the REC 1126 may be subject to various impairments due to the encoding processing, consequently, at least one In-loop Processing Filter (ILPF) 1128 is conditionally applied to the luma and chroma components of the reconstructed video data before storing in the Reference Picture Buffer 1132 to further enhance picture quality. A deblocking filter is an example of the ILPF 1128. Syntax elements are provided to an Entropy Encoder 1134 for incorporation into the video bitstream. In some embodiments of the present invention, each slice is encoded by always processing CTUs within each slice in a raster scan order. Edge checking or neighboring block availability checking for QP setting or CABAC initialization is only applied to slice boundaries according to some embodiment, and loop filtering processing is adaptively applied across slice boundaries. For example, deblocking filtering is adaptively applied across slice boundaries and deblocking filtering is not applied across tile boundaries. In another embodiment, a flag is signaled to control whether tile boundary related processing is enabled or disabled, edge checking and neighboring block availability checking for tile boundaries for QP derivation and CABAC initialization, and loop filtering processing across tile boundaries may be allowed when the flag indicates tile boundary related processing is enabled, otherwise edge checking and neighboring block availability checking are not applied to tile boundaries and loop filtering processing across tile boundaries is not allowed.

Figure 12:
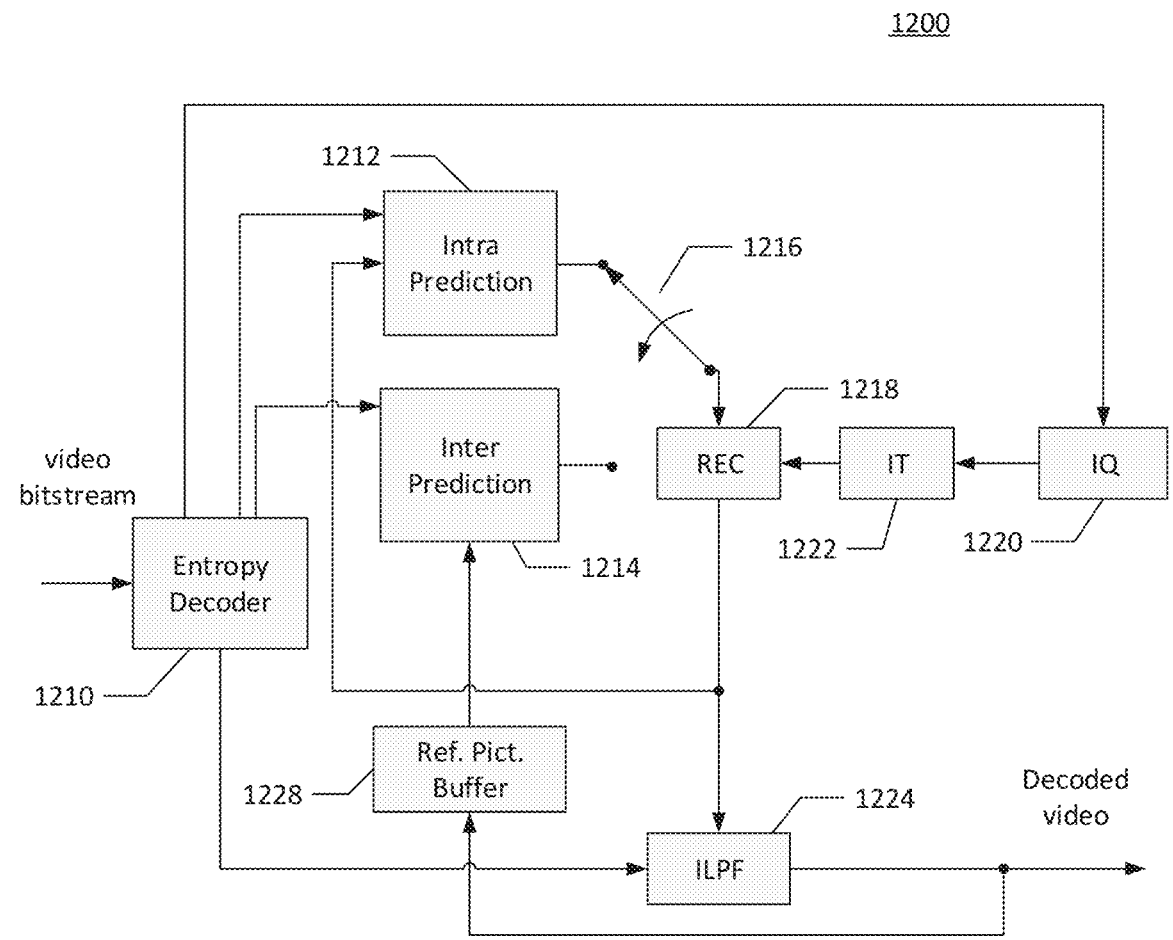
FIG. 12 illustrates an exemplary system block diagram for a video decoding system incorporating the video processing method according to embodiments of the present invention.

A corresponding Video Decoder 1200 for the Video Encoder 1100 of FIG. 11 is shown in FIG. 12. The video bitstream encoded by a video encoder is the input to the Video Decoder 1200 and is decoded by an Entropy Decoder 1210 to parse and recover the transformed and quantized residual signal and other system information of a current picture. The decoding process of the Decoder 1200 is similar to the reconstruction loop at the Encoder 1100, except the Decoder 1200 only requires motion compensation prediction in an Inter Prediction module 1214. Each block in each slice is decoded by either an Intra Prediction module 1212 or Inter Prediction module 1214. A Switch 1216 selects an intra predictor from the Intra Prediction module 1212 or Inter predictor from the Inter Prediction module 1214 according to decoded mode information. The transformed and quantized residual signal is recovered by an Inverse Quantization module (IQ) 1220 and an Inverse Transformation module (IT) 1222. The IQ module 1220 is also called a de-quantization module. The recovered residual signal is reconstructed by adding back the predictor in a Reconstruction (REC) module 1218 to produce reconstructed video. The reconstructed video of CTUs within each slice in the current picture are always processed by a raster scan order in the current picture. The reconstructed video is further conditionally processed by at least one In-loop Processing Filter (ILPF) 1224 to generate final decoded video. A deblocking filter is one example of the ILPFs 1224. In some embodiments of the present invention, loop filtering processing is conditionally applied across slice boundaries as tile boundaries are not considered in loop filtering processing. If the currently decoded picture is a reference picture, the reconstructed video of the currently decoded picture is also stored in a Reference Picture Buffer (Ref. Pict. Buffer) 1228 for later pictures in decoding order.

Various components of the Video Encoder 1100 and Video Decoder 1200 in FIG. 11 and FIG. 12 may be implemented by hardware components, one or more processors configured to execute program instructions stored in a memory, or a combination of hardware and processor. For example, a processor executes program instructions to control processing CTUs within each slice in a raster scan order. The processor is equipped with a single or multiple processing cores. In some examples, the processor executes program instructions to perform functions in some components in the Encoder 1100 and Decoder 1200, and the memory electrically coupled with the processor is used to store the program instructions, information corresponding to the reconstructed images of blocks, and/or intermediate data during the encoding or decoding process. In some examples, the Video Encoder 1100 may signal information by including one or more syntax elements in a video bitstream, and the corresponding Video Decoder 1200 derives such information by parsing and decoding the one or more syntax elements. The memory in some embodiments includes a non-transitory computer readable medium, such as a semiconductor or solid-state memory, a random access memory (RAM), a read-only memory (ROM), a hard disk, an optical disk, or other suitable storage medium. The memory may also be a combination of two or more of the non-transitory computer readable mediums listed above. As shown in FIGS. 11 and 12, the Encoder 1100 and Decoder 1200 may be implemented in the same electronic device, so various functional components of the Encoder 1100 and Decoder 1200 may be shared or reused if implemented in the same electronic device. For example, one or more of the Reconstruction module 1126, Inverse Transformation module 1124, Inverse Quantization module 1122, In-loop Processing Filter 1128, and Reference Picture Buffer 1132 in FIG. 11 may also be used to function as the Reconstruction module 1218, Inverse Transformation module 1222, Inverse Quantization module 1220, In-loop Processing Filter 1224, and Reference Picture Buffer 1228 in FIG. 12, respectively.

Embodiments of more efficient video processing methods may be implemented in a circuit integrated into a video compression chip or program code integrated into video compression software to perform the processing described above. For examples, encoding or decoding each slice by always processing CTUs within each slice in a raster scan order may be realized in program code to be executed on a computer processor, a Digital Signal Processor (DSP), a microprocessor, or field programmable gate array (FPGA). These processors can be configured to perform particular tasks according to the invention, by executing machine-readable software code or firmware code that defines the particular methods embodied by the invention.

The invention may be embodied in other specific forms without departing from its spirit or essential characteristics. The described examples are to be considered in all respects only as illustrative and not restrictive. The scope of the invention is therefore, indicated by the appended claims rather than by the foregoing description. All changes which come within the meaning and range of equivalency of the claims are to be embraced within their scope.

The invention claimed is:

1. A video processing method in a video encoding or decoding system, comprising:
receiving input data associated with a current picture, wherein the current picture is composed of a plurality of Coding Tree Units (CTUs) for encoding or decoding, and each CTU consists of a block of luminance (luma) samples and one or more corresponding blocks of chrominance (chroma) samples, wherein the current picture is partitioned into one or more slices including raster scan slices or rectangular slices, wherein each slice comprises an integer number of complete CTUs in the current picture that are exclusively contained in a single Network Access Layer (NAL) unit; and
for each slice in the current picture, encoding or decoding each slice by always processing CTUs within each slice in a raster scan order.

2. The method of claim 1, wherein the slices are raster scan slices formed by including multiple consecutive tiles or CTUs in a raster scan order, or the slices are rectangular slices formed by dividing the current picture into rectangular regions each containing multiple complete tiles or CTUs, wherein each tile is a rectangular region of CTUs within a particular tile column and a particular tile row in the current picture.

3. The method of claim 2, wherein each of the raster scan slices is specified based on a number of consecutive CTUs, and each of the rectangular slices is specified based on multiple grids with a grid column width and a grid row height in the unit of CTUs.

4. The method of claim 1, wherein the current picture is partitioned into a plurality of tiles, each tile consists of a rectangular region of CTUs within a particular tile column and a particular tile row in the current picture, wherein the step of encoding or decoding each slice further comprises disabling tile boundary related processing.

5. The method of claim 4, wherein tile boundary related processing comprises one or a combination of edge checking and neighboring block availability checking for tile boundaries for Quantization Parameter (QP) derivation and Context-based Adaptive Binary Arithmetic Coding (CABAC) initialization, and loop filtering processing across tile boundaries.

6. The method of claim 4, further comprising signaling or parsing a first flag, wherein the step of encoding or decoding each slice in the current picture comprises adaptively enabling or disabling tile boundary related processing based on a value of the first flag.

7. The method of claim 6, wherein the first flag is signaled in a Sequence Parameter Set (SPS) associated with the current picture or parsed from a SPS associated with the current picture.

8. The method of claim 4, wherein tile partitioning is used as a partition grid for slice layout.

9. The method of claim 1, wherein the current picture is composed of multiple subpictures, and each subpicture is a rectangular region of one or more slices within the current picture.

10. The method of claim 9, wherein subpicture boundary related processing overrides coinciding slice boundary related processing.

11. The method of claim 9, wherein the step of encoding or decoding each slice in the current picture comprises parallel processing based on subpicture or rectangular slice partitions.

12. The method of claim 9, wherein a slice syntax structure is signaled in a Sequence Parameter Set (SPS) and a subpicture syntax structure is represented by looping over a number of slices with a subpicture index and a subpicture ID.

13. The method of claim 1, wherein the step of encoding or decoding each slice in the current picture comprises enabling slice boundary related processing, wherein the slice boundary related processing comprises one or a combination of edge checking and neighboring block availability checking for slice boundaries for Quantization Parameter (QP)

derivation, and Context-based Adaptive Binary Arithmetic Coding (CABAC) initialization, and loop filtering processing across slice boundaries.

14. The method of claim 1, wherein syntax elements related to a position of a top-left CTU for each slice in the unit of CTUs, a slice width and slice height for each slice in the unit of CTUs are signaled or parsed for the current picture being partitioned into rectangular slices.

15. The method of claim 1, wherein syntax elements related to a raster scan CTU index of a first CTU in each slice and a number of CTUs in each slice are signaled or parsed for the current picture being partitioned into raster scan slices.

16. The method of claim 1, wherein shapes of the slices in the current picture are constrained during decoding to have an entire left boundary and entire top boundary consisting of picture boundaries or consisting of boundaries of previously decoded slices.

17. An apparatus of video processing method in a video encoding or decoding system, the apparatus comprising one or more electronic circuits configured for:
receiving input data associated with a current picture, wherein the current picture is composed of a plurality of Coding Tree Units (CTUs) for encoding or decoding, and each CTU consists of a block of luminance (luma) samples and one or more corresponding blocks of chrominance (chroma) samples, wherein the current picture is partitioned into one or more slices including raster scan slices or rectangular slices, wherein each slice comprises an integer number of complete CTUs in the current picture that are exclusively contained in a single Network Access Layer (NAL) unit; and
for each slice in the current picture, encoding or decoding each slice by always processing CTUs within each slice in a raster scan order.

* * * * *